United States Patent
Dehamel

(10) Patent No.: US 11,283,550 B2
(45) Date of Patent: Mar. 22, 2022

(54) DEVICE AND METHOD FOR ACKNOWLEDGING COMMUNICATIONS VIA BUS

(71) Applicant: STMicroelectronics (Grenoble 2) SAS, Grenoble (FR)

(72) Inventor: Arnaud Dehamel, Monestier de Clermont (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 0 days.

(21) Appl. No.: 17/072,738

(22) Filed: Oct. 16, 2020

(65) Prior Publication Data

US 2021/0126740 A1    Apr. 29, 2021

(30) Foreign Application Priority Data

Oct. 28, 2019   (FR) ..................................... 1912046

(51) Int. Cl.
| | |
|---|---|
| *H04L 1/18* | (2006.01) |
| *G06F 13/42* | (2006.01) |
| *H04L 12/40* | (2006.01) |
| *H04L 7/00* | (2006.01) |

(52) U.S. Cl.
CPC ............ *H04L 1/18* (2013.01); *G06F 13/4282* (2013.01); *G06F 13/4291* (2013.01); *H04L 7/0008* (2013.01); *H04L 12/40* (2013.01); *H04L 2012/40215* (2013.01)

(58) Field of Classification Search
CPC . H04L 1/18; H04L 12/40; H04L 1012/40215; H04L 7/0008; G06F 13/4282; G06F 13/4286; G06F 13/4291
See application file for complete search history.

(56) References Cited

U.S. PATENT DOCUMENTS

| | | | |
|---|---|---|---|
| 10,678,726 B2 | 6/2020 | Rennig et al. | |
| 2021/0073167 A1 | 3/2021 | Dehamel | |
| 2021/0073168 A1* | 3/2021 | Dehamel | ................ H04L 12/12 |

FOREIGN PATENT DOCUMENTS

DE         102012219940 A1    4/2014

* cited by examiner

*Primary Examiner* — Glenn A. Auve
(74) *Attorney, Agent, or Firm* — Slater Matsil, LLP

(57) ABSTRACT

An embodiment method comprises receiving at least one frame comprising consecutive bits transported by a serial bus; estimating an arrival period of a last bit of the consecutive bits; and starting a sending of an acknowledgement of receipt before the end of the estimated arrival period.

20 Claims, 2 Drawing Sheets

DEVICE AND METHOD FOR ACKNOWLEDGING COMMUNICATIONS VIA BUS

CROSS-REFERENCE TO RELATED APPLICATIONS

This application claims the benefit of French Application No. 1912046, filed on Oct. 28, 2019, which application is hereby incorporated herein by reference.

TECHNICAL FIELD

The present disclosure relates generally to electronic devices and methods, and in particular to a device intended to be coupled to a serial bus and an associated method.

BACKGROUND

Certain applications, in particular in the automotive industry, comprise numerous devices, such as computing units, sensors, etc., coupled with one another by a serial bus such as a Controller Area Network (CAN) bus. These devices communicate with one another via the CAN bus. In comparison with other communication couplings, the coupling via CAN bus allows a reduction of the number of cables used.

SUMMARY

There is a need, in the known systems comprising a conventional serial bus such as a CAN bus, to speed up its operation and/or to increase the length of the serial bus, and/or to increase its operational reliability vis-à-vis parasitics affecting the serial bus.

One embodiment addresses all or some of the drawbacks of the known methods of communication via serial bus.

One embodiment addresses all or some of the drawbacks of the known devices intended to be coupled to a serial bus.

One embodiment addresses all or some of the drawbacks of the known systems comprising devices coupled to a serial bus.

One embodiment provides a method comprising the steps consisting in: receiving at least one frame comprising consecutive bits transported by a serial bus; estimating an arrival period of a last bit of the consecutive bits; and starting a sending of an acknowledgement of receipt before the end of the estimated arrival period.

According to an embodiment, the consecutive bits have a same bit duration.

According to an embodiment, the estimated arrival period ends at a multiple of the bit duration after a reception of an edge.

According to an embodiment, the acknowledgement of receipt has a duration greater than or equal to the bit duration, preferably equal to the bit duration.

According to an embodiment, the method comprises a step consisting in ending the sending of the acknowledgement of receipt before the end of a further period having the bit duration and starting at the end of the arrival period, the sending of the acknowledgement of receipt preferably having a duration equal to the bit duration.

According to an embodiment, the sending of the acknowledgement of receipt is carried out at least until a sampling point of the acknowledgement of receipt.

According to an embodiment, the sending of the acknowledgement of receipt starts at the end of a delay after a sampling point of the last bit of the consecutive bits.

According to an embodiment, the delay lasts less than three, preferably a single, cycle time of a clock.

An embodiment provides a device configured to implement the above-defined method.

According to an embodiment, the device is further configured to read a value of the last bit of the consecutive bits at the sampling point of the last bit of the consecutive bits.

According to an embodiment, the delay is programmable.

According to an embodiment, the device comprises the clock.

An embodiment provides a system comprising a serial bus, preferably of the CAN type, and one or more first devices as defined above coupled to the serial bus.

According to an embodiment, the delay is common for the first devices.

According to an embodiment, the system comprises, coupled to the serial bus, a second device configured to send: first messages conveying a set of steps to be carried out by the first devices; and second messages addressed to a part of the first devices, the second messages conveying respective identifiers of the first devices to which the second messages are addressed, the second messages requesting that the first devices to which the second messages are addressed send respective reactions to the second device in respective expected time intervals. The first devices is configured to: receive the first messages, read the set of steps to be carried out, and implement steps as a function of the read set; and receive the second messages, and react to the second messages by the sending on the serial bus, in the respective expected time intervals, of reactions destined for the second device.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may have identical structural, dimensional and material properties.

For the sake of clarity, only the operations and elements that are useful for an understanding of the described embodiments herein have been illustrated and described in detail. In particular, parts of device circuits intended to be coupled to a serial bus, in particular transceiver units are not described in detail and/or are not illustrated. Indeed, the embodiments are compatible with conventional devices intended to be coupled to a serial bus, this compatibility in particular potentially being obtained by configuring, in a manner accessible to those skilled in the art, these devices in order to implement the embodiments of the methods described in the following.

Unless indicated otherwise, when reference is made to two elements that are connected together, this means a direct connection without any intermediate elements other than conductors, and when reference is made to two elements that are coupled together, this means that these two elements can be connected or coupled by way of one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
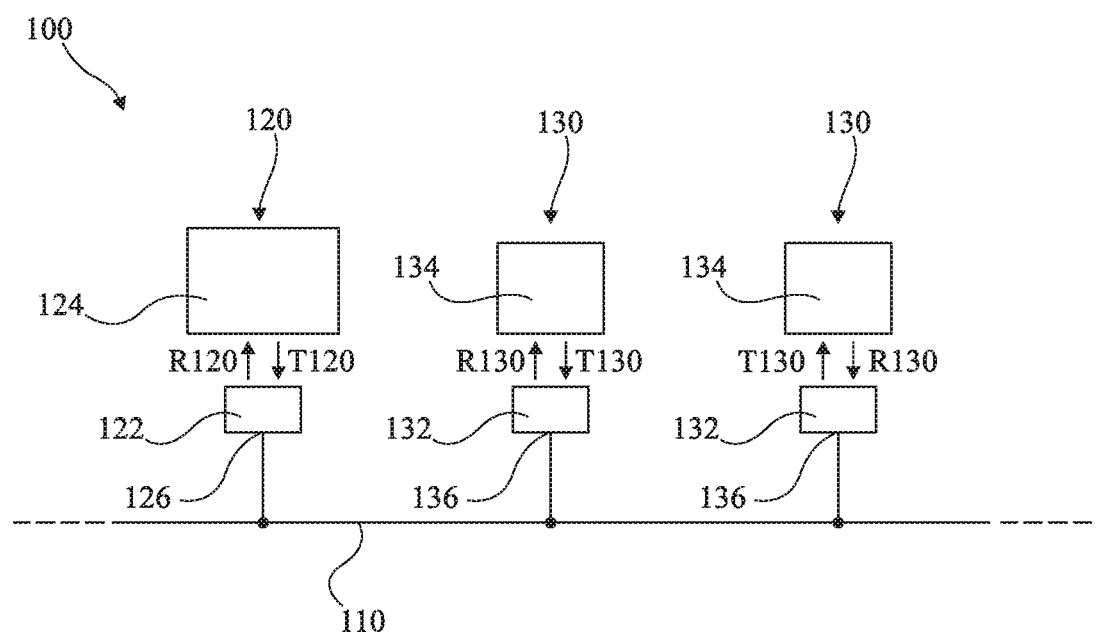
FIG. 1 illustrates, in a schematic fashion, a system comprising a serial bus and devices coupled to the bus, of the type to which the described embodiments apply.

FIG. 1 illustrates, in a schematic fashion, a system 100, comprising a serial bus 110, a device 120 and more than one device 130. The described embodiments apply to a system of the same type as the system 100. Two devices 130 are illustrated as an example, but the system 100 can comprise one or a plurality of devices 130.

The serial bus no is typically defined by two conductor wires. Preferably, the bus 110 is of the CAN type, typically defined by the standard ISO 11898. More preferably, the CAN bus is of the type flexible data rate CAN (FD CAN).

The devices 120, 130 are coupled, preferably connected, to the bus no. During operation, the devices 120 and 130 communicate data to one another via the bus no. For this purpose, the devices send and/or receive data transported by the bus no. Preferably, for transmitting data, each device sends one or more frames. By frame, a succession of bits disposed in accordance with a predefined order is understood. Each frame comprises, preferably, at least one start-of-frame bit and a plurality of end-of-frame bits. The bits of the data (or information) transmitted between devices are constituted by certain bits of the frame. Each bit corresponds to a logic level of the bus no during a duration TBIT (not illustrated in FIG. 1). By logic levels, two potential levels of the bus no are understood, preferably corresponding to respective recessive and dominant levels of the CAN bus no. The duration TBIT is, preferably, common to the bits of the frame. The duration TBIT is typically comprised between approximately 0.1 and 2 s, for example equal to 1 s, which corresponds to a data rate lower than approximately 1 Mbits/s, for example equal to 1 Mbits/s.

Preferably, the method of communication implemented by the system 100 is orchestrated by the device 120, called the master device. The devices 130 are thus called slave devices. In particular, each slave device 130 sends data on the bus no only after having received other data, sent by the master device 120, which indicate to it that it can, or must, send data. Preferably, each slave device 130 only sends its data in a time interval indicated by the master device 120. The master device 120 ensures that only one of the devices 120, 130 sends data on the bus at a time. Thus, the transmission priorities are managed exclusively by the master device 120.

Preferably, the devices 120, 130 implement a method as described in the Italian patent application no. 102018000003980 (17-GRA-0844), filed 26 Mar. 2018, incorporated here by reference. Such a communication method comprises the sending by the master device 120: of first messages conveying a set of steps to be carried out by the slave devices 130; and of second messages addressed to a part of the slave devices 130, these second messages conveying respective identifiers of the slave devices 130 to which the second messages are addressed. The second messages request that the slave devices 130 to which they are addressed send respective reactions to the master device 120 in respective expected time intervals. This communication method further comprises the implementation by the slave devices 130 of: the reception of the first messages, the reading of the set of steps to be carried out, and the implementation of steps as a function of the read set; and the reception of the second messages, and the reaction to the second messages by the sending on the bus, in the respective expected time intervals, of reactions destined for the master device 120.

Each device 120, 130 typically comprises a transceiver unit, respectively 122, 132, and a circuit, respectively 124, 134. More specifically, the transceiver unit 122, 132 couples the circuit 124, 134 to the bus 110. Preferably, the transceiver unit 122, 132 is connected to the circuit 124, 134 and to the bus 110, i.e. the unit 122, 132 connects the circuit 124, 134 to the bus 110. More specifically, the unit 122, 132 has an input/output 126, 136 connected to the bus 110. Each input/output 126, 136 typically comprises two nodes respectively connected to two wires constituting the bus 110. During operation, in order to send data, the circuit 124, 134 sends a signal T120, T130 conveying the logic levels to be applied to the bus 110. The transceiver unit 122, 132 provides the circuit 124, 134 with a signal R120, R130 conveying the logic levels of the bus 110, for example the signal R120, R130 is at a high level for a recessive state of the bus and at a low level for a dominant state of the bus 110. Thus, the circuit 124, 134 receives the data conveyed by the bus 110.

The circuits 124 and 134 can correspond to any conventional circuit using data transmitted by a serial bus and/or providing data to be transmitted by a serial bus. The circuit 124, 134 is typically, moreover, configured to carry out a logic and/or digital processing of the data. The one or more circuits 134 can comprise one or more sensors and/or actuators, not illustrated. In a preferred example, one or more of the circuits 134 are coupled, preferably connected, to light-emitting diodes of LED lights of a vehicle, and make it possible to control various visual effects of the LED lights. Each circuit 134 can comprise a processing circuit for processing the data sequentially, such as a microprocessor.

Figure 2:
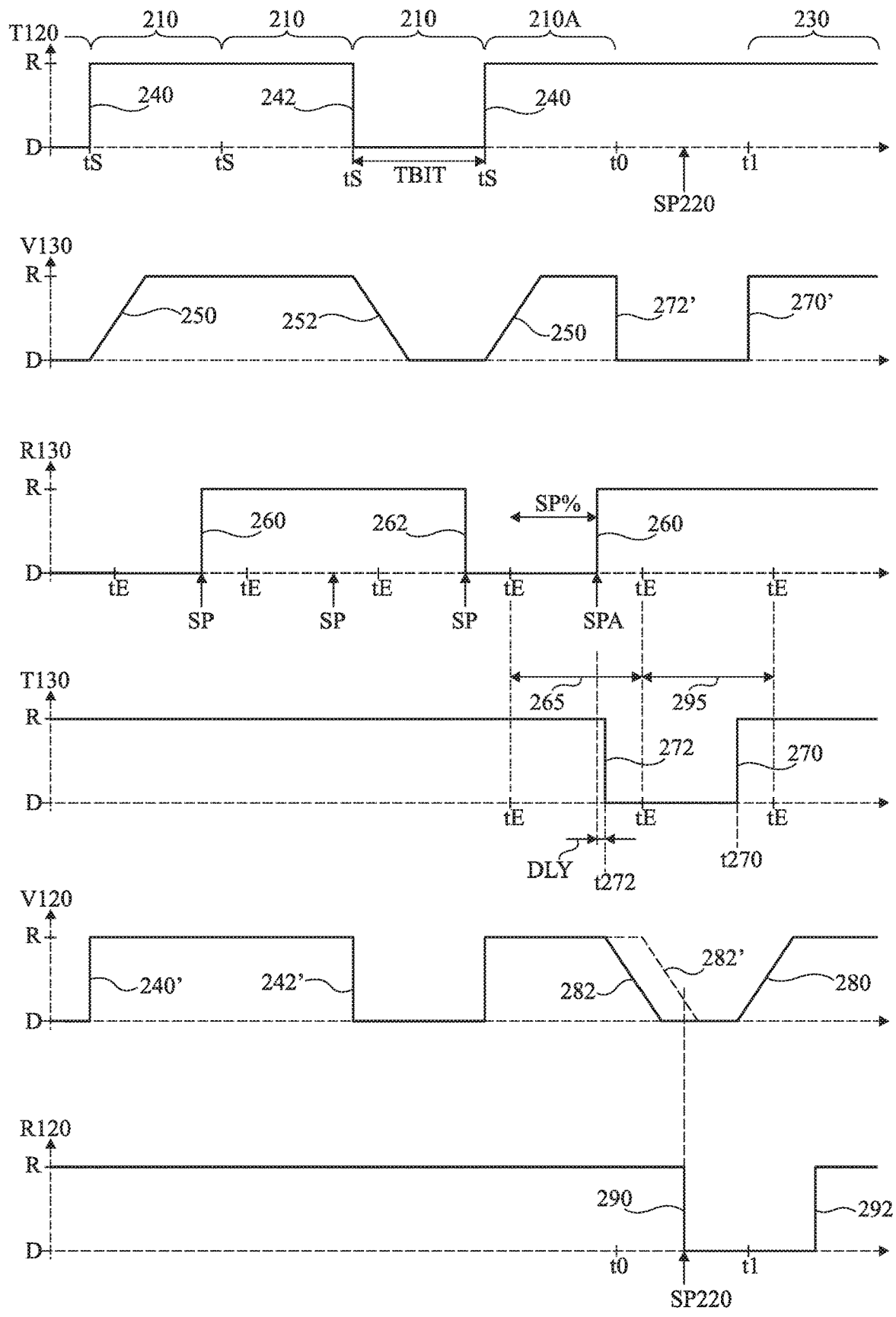
FIG. 2 illustrates time charts depicting an embodiment of a method for communicating in a system of the type shown in FIG. 1.

FIG. 2 illustrates time charts depicting an embodiment of a method for communicating in a system of the same type as the system 100 shown in FIG. 1. More specifically, this figure illustrates, in a very schematic fashion, plots as a function of time: of the signal T120 of the device 120, to be applied on the bus 110 by the unit 122; of a level V130 of the input/output 136 of one of the devices 130, this level corresponding, for example, to the potential of one of the nodes of the input/output 126; of the signal R130 of the device 130, provided by the unit 132 to the circuit 134; of the signal T130 of the device 130, to be applied on the bus 110 by the unit 132; of a level V120 of the input/output 126 of the device 120, this level corresponding, for example, to the potential of one of the nodes of the input/output 126; and of the signal R120 of the device 120, provided by the unit 122 to the circuit 124.

The signals and levels change between values corresponding to two levels of the bus 110, preferably to the dominant (D) and recessive (R) states of the CAN bus 110. The signals and levels are illustrated during a part of the frame sent by the device 120 and received by the device 130. The method is depicted in the following in the example where the device 120 is master and the device 130 is slave, but this example is not limiting, the described embodiments being compatible with any method of emitting and receiving a frame conveyed by a serial bus, preferably a CAN bus.

The master device 120 consecutively sends bits 210, 210A up to a time instant $t_0$. The bit 210A ends at the time instant $t_0$. By consecutively it is understood that the level of the signal T120 to be applied on the bus 110 does not change between two consecutive bits of a same value and that the passage between consecutive bits of different values corresponds to a rising edge 240 or a falling edge 242. The consecutive bits are delimited by time instants tS, in other words, each time instant tS is located at the end of the sending of a bit and at the beginning of the sending of the following bit. The rising edges 240 correspond here to the passage from the dominant state to the recessive state, and the falling edges 242 correspond here to the passage from the recessive state to the dominant state. The bit 240A is preferably in the recessive state. For the bits in the dominant state, the application of the signal T120 consists in placing the bus 110 at a low level. For the bits in the recessive state, the application of the signal T120 consists in leaving the bus 110 at a high level. For instance, the signal R120 of reception by the master device 120 remains in the recessive state during the sending of the bits 210 and 21A.

Preferably, the bits have predefined durations, which allows a distinction between consecutive bits of a same level. More preferably, the bits of the frame have the same bit duration TBIT, typically defined by the standard mentioned above for the CAN bus. The time instants tS are thus repeated regularly.

Preferably, the bits of the frame are in the order predefined by the standard mentioned above for the CAN bus. Thus, the consecutive bits 210, 210A preferably comprise data bits and possible stuffing bits. Moreover, the set of consecutive bits typically ends with error-detecting bits, for example of the cyclic redundancy check (CRC) type, followed by a delimitation bit (the bit 210A) which ends at the time instant $t_0$.

From the time instant $t_0$, and, preferably, up to a time instant $t_1$, the master device 120 does not send further bits, but expects to receive an acknowledgement receipt transmitted by the bus 110. In other words, the bit 210A is the last of the consecutive bits. More specifically, between the time instants to and ti, at a sampling point SP220, i.e. a time instant of reading the state of the bus 110, the master device 120 determines if the state of the bus 110 corresponds to the result of a sending of an acknowledgement of receipt by the slave device 130 or by at least one of the slave devices 130. For this purpose, preferably, the master device 120 leaves the bus 110 in the recessive state and receives the acknowledgement of receipt if, at the sampling point SP220, the bus 110 is placed in the dominant state by the slave device 130 or by at least one of the slave devices 130. The period from the time instant $t_0$ to the time instant $t_1$ preferably has a duration equal to the bit duration TBIT.

Preferably, after the time instant $t_1$, the master device 120 re-sends bits 230, typically an acknowledgement-of-receipt delimitation bit and end-of-frame bits.

The rising edges 240 and falling edges 242 of the signal T120 before an application on the bus 110 are translated, at their arrival at the input/output 136, by respective rising edges 250 and falling edges 252. The edges 250 and 252 thus delimit arrival periods at the input/output 136 for the bits sent by the master device 120.

At sampling points SP, SPA, the unit 132 reads the value of the respective bits 210, 210A that arrive on the input/output 136. At each sampling point SP, SPA, the unit 132 saves the read value. For each sampling point SP, SPA, the signal R130 provided by the unit 132 takes the value saved at this sampling point until the following sampling point. Thus, after each rising edge 240 or falling edge 242 of the signal T120, the signal R130 respectively has a rising edge 260 or falling edge 262. In the illustrated example, the reading of the bit 210A corresponds to one of the rising edges 260 of the signal R130. The signal R130 thus conveys the bits coming from the unit 132 toward the circuit 134. A communication between the devices 120 and 130 is thus obtained.

The unit 132 uses the edges 250 and/or 252 in order to define the sampling points SP in a synchronised manner with respect to the arrival periods of the bits on the input/output 136. For this purpose, the unit 132 receives the edges used for the synchronisation, preferably the falling edges 252. The synchronisation is carried out as of the time instants of reception of the edges.

The synchronisation consists, for the unit 132, in estimating, i.e. determining or evaluating, time instants tE delimiting the arrival periods of the bits on the input/output 136. The arrival period of each bit begins and ends at a time instant tE, within a precision. In other words, the time instants tE delimit estimated arrival periods of the bits on the input/output 136, corresponding to the arrival periods of the bits within the precision of the evaluation of the time instants tE.

The processing unit evaluates the time instants tE so that: the time instants tE are regularly repeated with a time interval equal to the bit duration TBIT, or substantially equal to the duration TBIT within a precision of a clock comprised in the slave device 130; and those of the time instants tE for which the bits are separated by an edge used for the synchronisation coincide, or substantially coincide, with the reception of this front. In still other words, the time instants tE are located at the reception of an edge and/or at an integer, or substantially an integer, of times the duration TBIT after the reception of an edge. Preferably, the unit 132 comprises a circuit, not illustrated, for detecting the arrival of the edges used for synchronisation, and the reception of an edge is thus defined by a time instant at which a signal internal to the unit 132 switches to a level corresponding to a detected edge. The described embodiments are compatible with the conventional ways of synchronising the reception of the bits with the arrival of the bits, i.e. of obtaining the estimated time instants tE.

In the estimated arrival period of each bit, i.e. between the estimated start time instant tE of the arrival period of the bit and the estimated end time instant tE of the arrival period of the bit, the sampling point is the time instant at which a predefined portion SP % of the bit duration TBIT has elapsed since the estimated start time instant tE of the arrival period of the bit. For instance, the predefined portion SP % represents between 50% and 80% of the bit duration TBIT, preferably approximately 70% of the bit duration TBIT.

The slave device 130 sends an acknowledgement of receipt, in the illustrated example by placing the signal T130 to be applied on the bus 110 in the dominant state. Preferably, the signal T130 remains in the recessive state during the reception of the bits 210, 210A as long as the last bit 210A has not been read, i.e. at least until the sampling point SPA. The acknowledgement of receipt is thus sent, preferably, after the sampling point SPA.

It is proposed here that the sending of the acknowledgement of receipt begin before the end of the estimated arrival period 265 of the bit 210A. The sending of the acknowledgement of receipt begins at a time instant t272 at which the signal T130 has a falling edge 272. Thus, the time instant t272 precedes the estimated end time instant tE of the arrival period of the last bit 210A. The acknowledgement of receipt is, preferably, sent up to a time instant t270, and the signal T130 has at this time instant t270 a rising edge 270. In the illustrated example, between the start time instant t272 and end time instant t270 of the acknowledgement of receipt, the unit 132 places the bus 110 in the dominant state. For instance, the signal R130 of reception by the slave device 130 remains in the recessive state during the sending of the acknowledgement of receipt.

The falling edge 272 and the rising edge 270 of the signal T130 are translated, at their arrivals at the input/output 126 of the master device 120, respectively by a falling edge 282 and a rising edge 280. The acknowledgement of receipt is received by the device 120 at the sampling point SP220 (dominant state between edges 290 and 292 of the signal R120).

In practice, during the conveyance of the bits 210 and 210A from the master device 120 to the slave device 130, the arrival of the edges 250 and 252 at the input/output 136 is subsequent to the edges 240 and 242 of the signal T120. In other words, there is a lag between the sending of the bits by the master device 120 and their arrival at the input/output 136. Moreover, the edges 250 and 252 at their arrival at the input/output 136 are not as steep as the edges 240 and 242 of the signal T120. In other words, the change in level V430 during an edge 250, 252 takes longer than the level change of the signal T120 to be applied. The level change V430 during edges 250 and 252 can further have a noisy aspect, not illustrated, for example oscillations before a stabilisation at the edge end.

Likewise, in practice, during the conveyance of the acknowledgement of receipt of the slave device 130 to the master device 120, the arrival of the edges 282 and 280 is subsequent to the edges 272 and 270. In other words, there is a lag between the sending of the acknowledgement of receipt by the master device 120 and its arrival at the input/output 126. Moreover, the edges 282 and 280 at their arrival at the input/output 136 are not as steep as the edges 272 and 270 of the signal T130. The level change V120 during the edges 282 and 280 can also have a noisy aspect, not illustrated.

These lags and these noisy aspects are due to various phenomena such as attenuation and parasitics, which occur during the propagation on the bus 110 from the input/output 126 to the input/output 136 and from the input/output 136 to the input/output 126. The longer the bus 110 and the more the latter is subjected to parasitics, the greater the lags and the more considerable the noisy aspects.

Moreover, during the sending of the bits 210 and 210A, the edges 240 and 242 of the signal T120 are translated by edges 240' and 242' of the level V120 of the input/output 126 potentially exhibiting in practice, with respect to the edges 240 and 242, a noisy aspect and a lag, not illustrated, which join those produced by the propagation on the bus 110. Likewise, during the sending of the acknowledgement of receipt, the edges 272 and 270 of the signal T130 are translated by edges 272' and 270' of the level V130 of the input/output 136 potentially exhibiting in practice, with respect to the edges 272 and 270, a noisy aspect and a lag, not illustrated, which join those produced by the propagation on the bus 110.

As a result of the lag and the noisy aspect of the edges 250, a lag appears, in practice, between the time instants tS delimiting the bits 210 emitted by the master device 120, and the time instants tE delimiting the estimated arrival periods of the bits on the input/output 136 of the slave device 130.

It would have been conceivable to send the acknowledgement of receipt only when the bit 210A had finished arriving. For example, it would have been conceivable, in order to synchronise the acknowledgement of receipt with the bits of the frame, to send the acknowledgement of receipt at the time instant tE at which it is estimated that the end of the arrival of the bit 210A will occur. There would thus have been a risk that the starting edge (dotted line 282') of the acknowledgement of receipt is not finished at the sampling point SP220 for sampling the acknowledgement of receipt by the master device 120. By comparison, the fact that it is provided to send the acknowledgement of receipt before the end of the estimated arrival period 265 of the bit 210A, makes it possible to reduce the risk, for a given length of the bus 110 and a given level of parasitics, that the sampling point is not located after the end of the edge 282. The risk that the acknowledgement of receipt is not received correctly by the master device 120 is thus reduced. In other words, the level of reliability of the communication via the bus 110, at a given length, has been increased. In the same way, it is possible, at a given level of reliability, to increase the length of the bus 110, which corresponds to an increase in the lags mentioned above. It is also possible, at a given level of reliability, to retain the constant lags by retaining the length, but increasing the operational frequency of the bus 110 (in other words, reduce the duration TBIT). Thus, by providing the sending start of the acknowledgement of receipt before the end of the period 265, it is possible to speed up the operation and/or to increase the length of the bus 110, and/or to increase the operational reliability vis-à-vis parasitics affecting the bus 110.

Preferably, the sending end time instant t270 of the acknowledgement of receipt is located before the end of a period 295 having the duration TBIT following the estimated arrival period 265 of the bit 210A. By this means, it is possible to ensure that the sending of the acknowledgement of receipt by the slave device 130 does not disrupt the sending, by the master device 120, of the bits 230 of the frame situated after the acknowledgement of receipt. More preferably, the duration of the sending of the acknowledgement of receipt is equal to the bit duration, or substantially equal to the bit duration with the precision of a clock-cycle time.

Preferably, the sending of the acknowledgement of receipt is carried out at least until the sampling point SP220 of the acknowledgement of receipt. In other words, the time instant t270 is subsequent to the sampling point SP220. By this means, it is possible to ensure that the level of the bus 110 is always the sending level of the acknowledgement of receipt at the moment when the acknowledgement of receipt is read by the master device 120.

The fact that the acknowledgement of receipt is sent after the sampling point SPA of the bit 210A allows the slave device 130 to verify that all the consecutive bits 210, 210A preceding the acknowledgement of receipt have been received before the sending of the acknowledgement of receipt. More preferably, in the case where the slave device 130 comprises a clock and a processing unit for sequentially processing data cadenced by the clock, a delay DLY of at least one cycle time of a clock internal to the slave device 130 is provided between the sampling point SPA and the sending start time instant t272 of the acknowledgement of receipt.

Preferably, the delay DLY between the sampling point SPA and the time instant t272 is less than three clock-cycle times, more preferably equal to one clock cycle. Compared to a longer delay, this makes it possible to increase the time between the sending start time instant t272 of the acknowledgement of receipt and the end of the estimated arrival period 265 of the bit 210A, and thus, as mentioned above, to increase the reliability and/or the length of the bus and/or the frequency. For this purpose, preferably, all verification operations, for example the verification of the CRC, are carried out before the sampling point SPA, so that, once the bit 210A has been received, a single operation of verifying the value of the received bit 210A remains to be carried out before sending the acknowledgement of receipt.

Preferably, the slave device 130 is configured so that, for example programmed so that, the delay DLY between the sampling point SPA and the sending start time instant t272 of the acknowledgement of receipt can be programmed, preferably selected from multiples of the clock-cycle time. The selection is carried out, for example, by providing a value to a programme. This allows an adaptation of the slave device 130 to various lengths of the bus 110 and/or to various operational frequencies of the bus 110 and/or to various levels of parasitics to which the bus 110 is subjected.

The system implementing the method described above in relation to FIG. 2 preferably comprises a plurality of slave devices 130. In this case, more preferably, the delay DLY in each slave device 130 between the sampling point SPA and the sending start time instant t272 has the same duration for all the slave devices 130. This allows an optimization of the reception of the acknowledgement of receipt by the master device 120.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

What is claimed is:

1. A method comprising:
receiving at least one frame comprising consecutive bits transported by a serial bus;
estimating an arrival period of a last bit of the consecutive bits; and
starting a sending of an acknowledgement of receipt before an end of the estimated arrival period.

2. The method according to claim 1, wherein the consecutive bits each has a same bit duration.

3. The method according to claim 2, wherein the estimated arrival period ends at a multiple of the bit duration after a reception of an edge.

4. The method according to claim 2, wherein the acknowledgement of receipt has a duration greater than or equal to the bit duration.

5. The method according to claim 2, wherein the acknowledgement of receipt has a duration equal to the bit duration.

6. The method according to claim 2, further comprising ending the sending of the acknowledgement of receipt before an end of a further period having the bit duration and starting at an end of the arrival period.

7. The method according to claim 6, wherein the sending of the acknowledgement of receipt has a duration equal to the bit duration.

8. The method according to claim 1, wherein the sending of the acknowledgement of receipt is carried out at least until a sampling point of the acknowledgement of receipt.

9. The method according to claim 1, wherein the sending of the acknowledgement of receipt starts at an end of a delay after a sampling point of the last bit of the consecutive bits.

10. The method according to claim 9, wherein the delay is less than three cycle times of a clock.

11. The method according to claim 10, wherein the delay is a single cycle time of the clock.

12. A device configured to:
receive at least one frame comprising consecutive bits transported by a serial bus;
estimate an arrival period of a last bit of the consecutive bits; and
start a sending of an acknowledgement of receipt before an end of the estimated arrival period.

13. The device according to claim 12, wherein the sending of the acknowledgement of receipt starts at an end of a delay after a sampling point of the last bit of the consecutive bits; and
wherein the device is further configured to read a value of the last bit of the consecutive bits at the sampling point of the last bit of the consecutive bits.

14. The device according to claim 13, wherein the delay is programmable.

15. The device according to claim 12, further comprising a clock; and
wherein the sending of the acknowledgement of receipt starts at an end of a delay after a sampling point of the last bit of the consecutive bits; and
wherein the delay is less than three cycle times of the clock.

16. A system comprising:
a serial bus; and
one or more first devices coupled to the serial bus, wherein each of the first devices is configured to:
receive at least one frame comprising consecutive bits transported by the serial bus;
estimate an arrival period of a last bit of the consecutive bits; and
start a sending of an acknowledgement of receipt before an end of the estimated arrival period.

17. The system according to claim 16, wherein the serial bus is a Controller Area Network (CAN) bus.

18. The system according to claim 16, wherein the sending of the acknowledgement of receipt starts at an end of a delay after a sampling point of the last bit of the consecutive bits, and wherein the delay is common for the first devices.

19. The system according to claim 16, further comprising a second device coupled to the serial bus, wherein the second device is configured to send:
first messages conveying a set of steps to be carried out by the first devices; and
second messages addressed to a portion of the first devices, the second messages conveying respective identifiers of the first devices to which the second messages are addressed, the second messages requesting that the first devices to which the second messages are addressed send respective reactions to the second device in respective expected time intervals;

wherein the first devices are configured to receive the first messages, read the set of steps to be carried out, and implement implementation steps as a function of the read set of steps; and wherein the portion of the first devices are configured to receive the second messages, and react to the second messages by sending, on the serial bus, in the respective expected time intervals, the respective reactions destined for the second device.

20. The system according to claim 16, wherein each of the first devices further comprises a clock; and wherein, for each first device, the sending of the acknowledgement of receipt starts at an end of a delay after a sampling point of the last bit of the consecutive bits, and the delay is less than three cycle times of the clock.

* * * * *